United States Patent

Zingg

[15] 3,644,901

[45] Feb. 22, 1972

[54] DIGITAL SYSTEM FOR CONTROLLING SIGNAL TRANSFERS BETWEEN REGISTERS AND DATA BUSES

[72] Inventor: Roy J. Zingg, Ames, Iowa

[73] Assignee: Iowa State University, Ames, Iowa

[22] Filed: July 24, 1969

[21] Appl. No.: 844,319

[52] U.S. Cl. ..........340/172.5

[51] Int. Cl. ..........G06f 15/00, G06f 15/56

[58] Field of Search ..........340/172.5; 235/157

[56] References Cited

UNITED STATES PATENTS

| | | | |
|---|---|---|---|
| 3,242,467 | 3/1966 | Lamy | 340/172.5 |
| 3,303,476 | 2/1967 | Moyer et al. | 340/172.5 |
| 3,340,514 | 9/1967 | Swift | 340/172.5 |

*Primary Examiner*—Gareth D. Shaw
*Attorney*—Dawson, Tilton, Fallon & Lungmus

[57] ABSTRACT

The selective transfer of data signals from selected ones of a plurality of storage registers to selected ones of a separate number of data buses is achieved by storing control signals in control registers associated with each of the storage registers. The control signals indicate the data bus to which the signal contents of the storage register associated with that control register are to be transmitted; and gating circuitry responsive to the control register signals couple the signal contents of the registers to the proper data buses. The communication between registers and buses is maintained until the contents of one of the control registers is changed. Thus, a number of registers may communicate with a number of buses simultaneously; and the contents of a bus may be operated on directly. Circuitry is also disclosed for simultaneously coupling the signal contents of data buses to selected registers.

5 Claims, 2 Drawing Figures

PATENTED FEB 22 1972 3,644,901

SHEET 1 OF 2

INVENTOR
ROY J. ZINGG
BY: Dawson, Tilton, Fallon & Lungmus
ATTY'S

INVENTOR
ROY J. ZINGG
BY: Dawson, Tilton, Fallon & Lungmus
ATTY'S

DIGITAL SYSTEM FOR CONTROLLING SIGNAL TRANSFERS BETWEEN REGISTERS AND DATA BUSES

BACKGROUND AND SUMMARY

The present invention relates to digital data processing systems; more particularly, it relates to digital systems which include a multiplicity of data buses. A data bus is a plurality of signal lines along which all of the composite binary signals comprising one "word" or "byte" or a portion of a word may be transmitted in parallel. A data bus has the further connotation that all of the lines are routed together through various portions of a system so that one of a number of different registers may be selected to transmit data signals to the bus while at the same time, a separate register may be selected to receive those signals transmitted from the first register via the data bus.

In earlier digital systems, separate paths were usually provided for all anticipated transfers of data signals. Subsequently, systems were designed as the so-called "bus-oriented" systems wherein the signal contents of selected registers are unloaded onto or loaded from one or more data buses. Generally, the data buses are time-shared; and the signal contents of a selected register are transmitted to a bus only for a predetermined time sufficient to transfer the data signals into a second selected register. That is to say, a control signal is used to gate the signal contents of a selected register onto a bus and for coupling the bus to the inputs of a second register. The gates are energized only for a predetermined and constant time sufficient to permit the transfer of data signals from the first register to the second register.

The present invention relates particularly to a system and circuitry for selecting one of several storage registers, controlling the gating of binary information signals from the selected register, and transmitting those data signals to a selected one of a plurality of binary data buses. In so doing, it has been found to be advantageous to permit the data signals of a number of selected registers to be present on a corresponding number of data buses for an indefinite period of time. For example, in some applications it might be desirable to establish the data transmission paths and permit these to remain established for the duration of a sequence of operations being performed. Thus, rather than operating on the data contents of a particular register, the present invention contemplates that the operations be performed directly on the data signal contents of a data bus. If there are more registers than data buses, the inventive system yields an increased versatility in the operation and capability of the system with only nominal increases in the circuitry required.

It is contemplated that according to the present invention there are more registers than there are buses. Associated with each register is a control register having sufficient load control flip-flops to designate one of the buses onto which the signal contents of that register are to be loaded. Gate means are included for loading the signal contents of the selected register onto the selected bus responsive to the load control flip-flops. Similar circuitry may be provided for unloading the contents of a selected bus into one of the registers. Since the means for actuating the load control flip-flops may actuate a number of them at the same time, the signal contents of different registers may be loaded onto different buses in parallel. As will be explained more fully after the system has been described in greater detail, this adds to the versatility and capability of the system. It will also be appreciated that the output signals of other combinational logic nets may be loaded onto a selected bus by similar means, and that the existence of register contents on a selected bus is dependent only upon the combination of signals stored in the load control flip-flops. Thus, the contents of a bus will not be changed until the signals in a control register associated with a storage register are changed. Thus, the contents of the bus may be operated on directly.

Other features and advantages of the instant invention will be apparent to persons skilled in the art from the following detailed description of a preferred embodiment accompanied by the attached drawing.

THE DRAWING

FIG. 1 is a functional block schematic of a system according to the present invention; and FIG. 2 is a more detailed logic schematic diagram showing the selective loading and unloading of one register onto the data buses.

DETAILED DESCRIPTION

Figure 1:
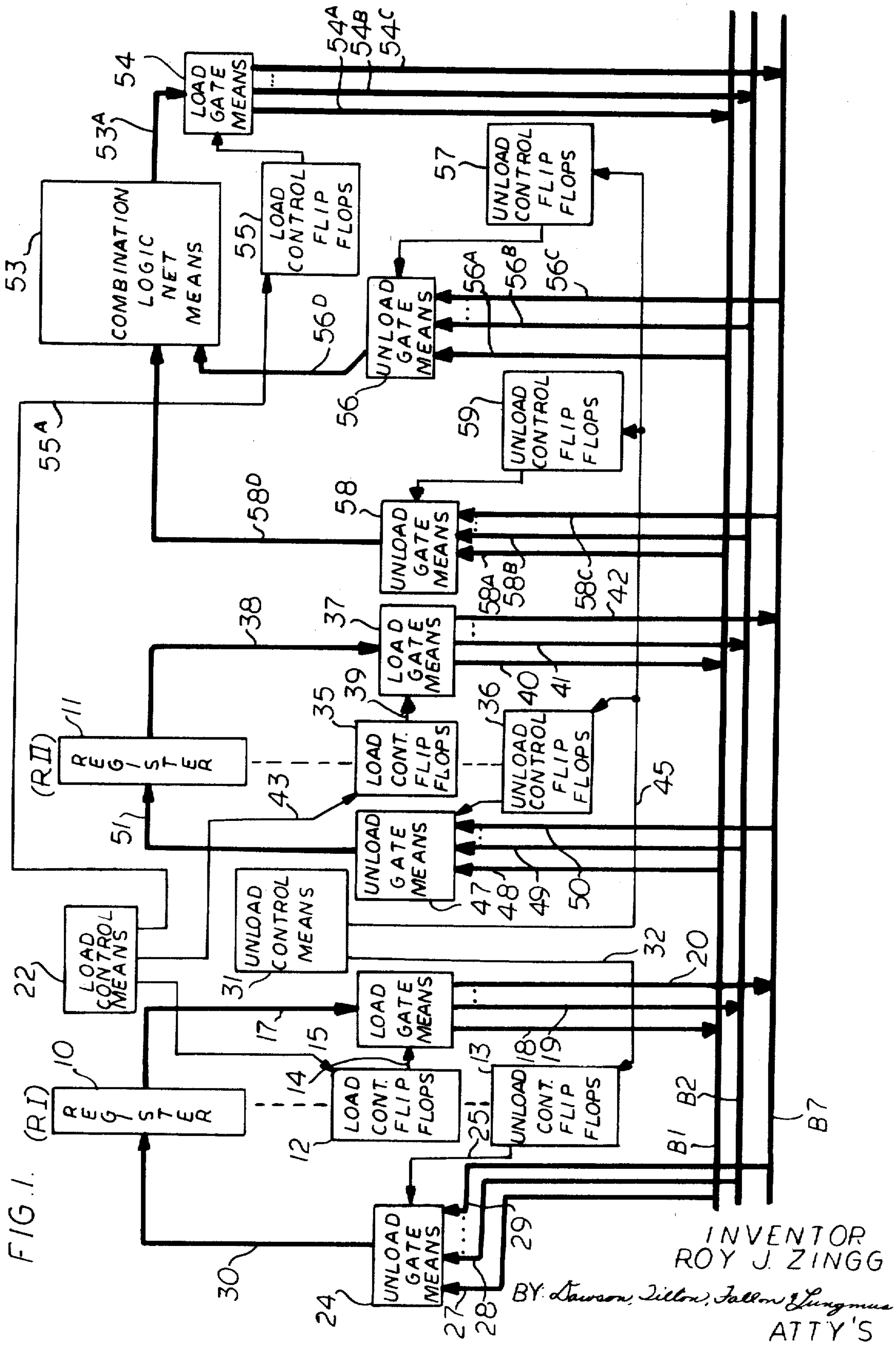

For simplifying the understanding of the illustrated system, a relatively heavy line interconnecting two blocks in FIG. 1 will designate a plurality of separate lines of a number sufficient to handle all of the bits for which the system is designed, whereas the relatively narrow lead lines are primarily for transmitting control signals.

Referring then to FIG. 1, reference numeral 10 designates a block which functionally represents a binary register (sometimes referred to as RI). The register 10 may comprise any one of a number of structures well known in the art. For example, it may include a plurality of bistable circuits (commonly known as flip-flops), each flip-flop storing a bit and having a true as well as a complementary output. A second register is designated 11 (sometimes referred to as RII). To help in keeping the nomenclature clear for making distinctions, the register RI and RII will sometimes be referred to as storage registers whereas the registers that control the routing of the data will be referred to as control registers. The illustrated embodiment contemplates seven data buses, but for brevity only three of the data buses are shown, and these are designated respectively B1, B2, and B7.

For simplicity, it will be assumed that each of the storage registers RI and RII as well as the data buses B1–B7 are capable of storing or transmitting the same number of bits—for example, 24 binary digits. It will be appreciated, or course, that any arbitrary number of bits will work equally as well. Further, the number of bits capable of being stored by a register may be greater than the number of individual lines in a data bus; conversely, there may be fewer flip-flops in a register than there are separate lines in a bus. In the first case, subsequent description will relate only to a portion of an actual physical register; whereas, for the latter case, it will be assumed that nothing will be transmitted to the excess lines in a data bus. Associated with storage register 10 is a control register comprising a number of load control flip-flops 12 and an equal number of unload control flip-flops 13. The dashed line interconnecting the boxes designated 10, 12 and 13 represents an associated control function; and it will be appreciated that each of the load control flip-flops 12 and unload control flip-flops 13 are themselves registers and may comprise circuitry similar to that in the register 10. The control registers 12 and 13 do not, normally however, have as many bistable circuits as does the register 10, as will be clear from subsequent description. The load control flip-flops 12 are coupled by means of a plurality of output lines designated 14 (only one is shown in FIG. 1 for brevity) to load gate means 15 which receives the output signal contents of the storage register 10 along a plurality of separate line, schematically shown at 17. Seven output channels couple the output of the load gate means 15 respectively to the data buses B1–B7. Only three of the output channels from the load gate means 15 are shown in the drawing; and they are designated 18, 19 and 20 respectively. It will be appreciated that each of the channels connecting the output signals of the load gate means to one of the data buses includes a plurality of separate lines, one for each of the data bits stored in the register 10. The signal contents of the register 10 are routed to a selected one of the data buses B1–B7 through the load gate means 15 depending upon the signal contents of the load control flip-flops 12. Some means is provided for determining the signal contents of the load control flip-flops or control register 12; and this is schematically designated by the block 22. Thus, depending upon the signals received from the load control means 22, signals transmitted along the lines 14 to the load gate means will couple the input lines 17 to one of the output channels or, alternatively, to none of the output channels so that the contents of register 10 are not transmitted through the load gate means 15.

Unload gate means 24, controlled by the signal contents of the unload control flip-flop 13 along lines 25, receives the input data respectively from the data buses B1–B7 through seven input channels, three of which are shown and designated respectively 27, 28 and 29. Depending upon the signal contents of the unload control flip-flops 13, the signal contents of one of the data buses B1–B7 will be routed through the unload gate means 24 (upon the occurrence of a strobe pulse timed to insure that the signals are quiescent) to the flip-flops in the register 10 by means of the lines 30. An unload control means schematically designated by the block 31 controls the states of the flip-flops 13 to enable the contents of a selected one of the data buses B1–B7 to be fed into the storage register 10 through the unload gate means 24 or, alternatively, to render the unload gate means inactive so that the contents of none of the data buses B1–B7 is coupled to the input of the register 10.

Any number of registers such as the RI and RII registers illustrated may be employed with circuitry similar to that which has been just described, namely, that load control means energizes a control register (similar to register 12) which activates load gate means to transfer the signal contents of the register 10 onto a selected one of the data buses or onto none of the data buses. Similar unload means are employed to select one of the data buses and to transfer the signal contents thereof into the register 10 under a suitable command from the unload control means 31 along line 32. For larger numbers of registers, the capacity of the load control means 22 and unload control means 31 will obviously have to be increased, the only requirement being that these subsystems be capable of generating command signals to control their associated load and unload control registers separately and independently.

Thus, there is circuitry associated with the storage register 11 similar to that which has already been described for the register 10, including an associated load control register or load control flip-flops 35, unload control register or unload control flip-flops 36, a load gate means 37 receiving the output data signals from the register 11 along a plurality of separate lines illustrated diagrammatically as a single line 38 and controlled by the load control flip-flops 35 along lines 39. The load gate means 37 may selectively couple the signal output contents of the register 11 to any one of the data buses B1–B7, three coupling channels being illustrated and designated respectively 40, 41, and 42. The load control flip-flops 35 are controlled by a command statement received along lines 43 from the load control means 22.

The unload control flip-flops 36 (themselves controlled by a command received along the lines 45 from the unload control means), control unload gate means 47 for selecting the contents of one of the buses B1–B7 along separate unload channels, three of which are designated respectively 48, 49, and 50, to the register 11 along lines 51.

It will be appreciated that the inventive system is not necessarily restricted to the use of registers such as those designated RI and RII, but may be used in combination with any combinational logic network; and this is diagrammatically illustrated by the block 53 which has a plurality of data bits which may be selectively coupled along lines 53*a* through the load gate means 54 to a selected one of the data buses B1–B7 along an output channel, three of which are illustrated and designated respectively 54*a*, 54*b*, and 54*c*, the load gate means 54 being controlled by a load control register or load control flip-flops 55. The load control flip-flops 55 are, in turn, controlled by a command received from the load control means 22 along lines 55*a*.

In the illustrated embodiment there are two separate mechanisms for selecting one of the data buses B1–B7 and for transferring the contents thereof to the combinational logic net means 53. These subsystems may be identical to each other, and they are similar to the previously described circuitry for unloading the contents of a selected bus into one of the registers 10 or 11. Thus, unload gate means 56 has a plurality of input channels, one for each of the data buses; three of the input channels are illustrated and designated respectively 56*a*, 56*b*, and 56*c*. The input channels 56*a*–56*c* are connected respectively to the data buses B1–B7. An unload control register or unload control flip-flops 57 receives signals from the unload control means 31 along line 45 (which actually is a number of separate lines) for controlling the enabling of the gates in the unload gate means 56—that is, for selecting the desired data bus. The output signals of the unload gate means from the selected data bus are then transferred along a channel 56*d* to the combinational logic net means 53.

An identical unload system for transferring the contents of a selected data bus into the combinational logic net means 53 includes unload gate means 58 having input channels 58*a*–58*c* connected respectively to the data buses B1–B7, it is controlled by unload control flip-flops 59 to transfer the contents of a selected data bus to the combinational logic net means by means of a channel 58*d*. It will be appreciated that each of the separate transfer channels 56*d* and 58*d* may be to separate functional subsystems within the generalized term of combinational logic net means. Subsequent examples will clarify the versatility of the system; but for present purposes it is noted that more than one means may be employed to select a particular data bus and to transfer the contents thereof to a predetermined input channel to the combinational logic net means. Unlike the previous unload gate means, no strobe pulse is provided. Rather, the signal contents of the selected bus is continuously presented to the input channel of the combinational logic net.

Figure 2:
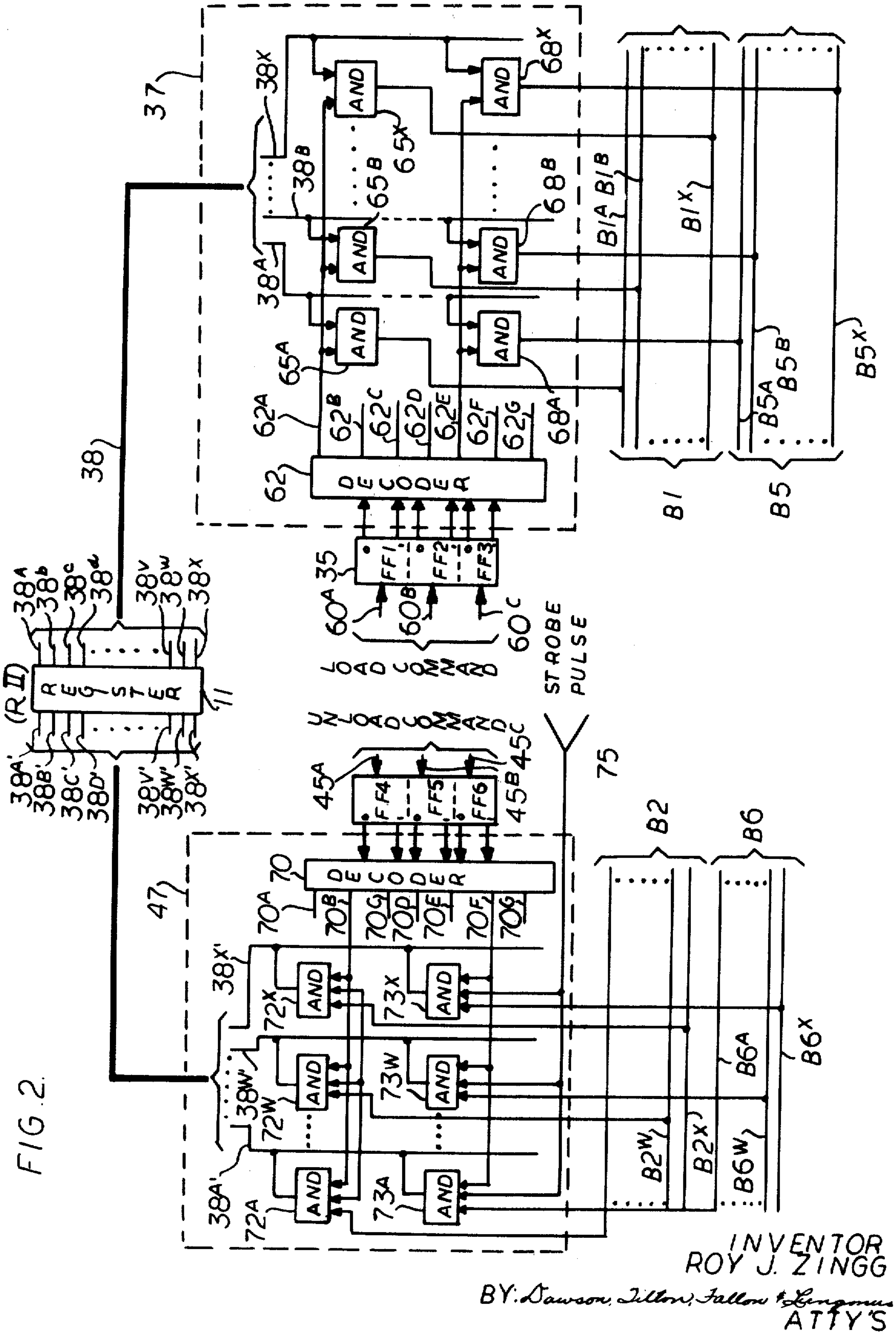

Turning now to FIG. 2, the detailed logic circuitry associated with one of the storage registers (RII) for selectively transferring the information from that register to a data bus and for selectively transferring the information from a data bus to that register will now be described in greater detail. It will be appreciated that the same circuitry may be used to load and unload the register RII as well as the combinational logic net means 53, and it, therefore, need not be repeated for a complete understanding of the invention. As has already been mentioned, the particular example contemplates that the registers are capable of storing a fixed number (24) of bits. The previously described lines 38 thereof comprises a total of 24 separate lines; and these are designated respectively 38*a*–38*x*.

For purposes of presenting a specific example, as has already been mentioned, there are seven data buses in the system. Therefore, the load flip-flops 35 may include three separate flip-flops and a complementary output designated respectively by a "1" and a "0" in the drawing. The line 60 of the FIG. 1 comprises three separate lines 60*a* coupled to the input of FF1, 60*b* coupled to the input of FF2, and 60*c* coupled to the input of FF3. Six such lines could be used if it is desired to use both the set and reset inputs of the flip-flops in the control register 35. Thus, there are eight possible output states ($2^3$) for the control register 35. One of the states is reserved for the case in which it is desired not to connect the output lines 38 of register 11 to any of the data buses; and the remaining states of the control register are used for coupling these output lines 38 to a selected one of the seven data buses B1–B7. In general, if there are N−1 data buses then there must be a corresponding number, K, of control flip-flops defined by a relationship in which $2^K$ is greater than N. This insures adequate states in the control register to couple the contents of the storage register 11 to any one of the data buses or (as a separate signal state) to none of the data buses.

A decoder network identified by the block 62 receives the outputs of the flip-flops in the control register 35; and the decoder 62 includes seven separate output lines designated respectively 62*a*, 62*b*, 62*c*–62*g*. These output lines are associated respectively with the data buses B1–B7; and the decoder network 62 may be a conventional diode decoder which generates a signal on one and only one of the output lines depending upon the combinational states of the flip flops FF1–FF3. For example, if the states of the flip-flops in the control register 35 are 001, then a signal will appear on the output lines 62*a*; and the contents of storage register 11 will be coupled to data bus B1. The gating is accomplished by a matrix of AND gates which (in the drawing) has as many columns as there are bits stored in the register 11 and as many rows as there are data buses (N−1). Since the interconnections for each of the decoder output lines is the same, the circuitry associated with only two of these output lines is illustrated, and this is only partially illustrated because the interconnection between a given bit line and one of the columns of AND gates in the gating matrix of AND gates includes 24 separate AND gates designated 65*a*–65*x*, each AND gate having an enabling input, a signal input, and an output terminal.

The enabling input of each of the AND-gates 65*a*–65*x* is connected to the output line 62*a* of the decoder 62; and the signal inputs of each of the AND-gates 65*a*–65*x* are connected respectively to the output lines 38*a*–38*x* of the register 11. The output terminals of the AND-gates 65*a*–65*x* are connected respectively to the separate lines of the data bus B1, designated respectively B1*a*–B1*x*. It is therefore clear that when the control register 35 is in the state 001, the decoder 62 will energize the line 62*a*; and the output lines 38*a*–38*x* will be coupled directly to the lines B1*a*–B1*x* of the data bus B1—thus coupling the output signal contents of register 11 to the data bus B1.

A second example is illustrated for coupling the output signal contents of the register 11 to a data bus—namely, data bus B5. The fifth row of the decoding AND gate matrix comprises 24 AND gates designated respectively 68*a*–68*x*. The enabling input terminal of each of the AND-gates 68*a*–68*x* is connected directly to the line 62*e* of the output of the decoder 62; and the signal inputs are connected respectively to the lines 38*a*–38*x* of the register 11. The output terminals of each of the AND-gates 68*a*–68*x* are directly connected respectively to the individual lines B5*a*–B5*x* of the data bus B5. As has already been mentioned, similar rows of AND gates are provided in the gating matrix, each row being actuated by a different one of the output leads of the decoder 62 for coupling the output signal leads of the register 11 to a different data bus.

As has already been mentioned, the same loading scheme just described may be employed for the load gate means 54 and the load control flip-flops 55 of FIG. 1 for selectively coupling the output leads of any combinational logic net means 53 to one of the data buses as determined by command signals transmitted along the lines 55*a*.

Turning now to the portion of the system which unloads a selected data bus into the register 11, two different data buses (namely buses B2 and B6) are selected for illustration. The unload control flip-flops 36 take the form of three separate flip-flops FF4–FF6 in FIG. 2; and they are controlled by an unload command received from the unload control means 31 along lines 45*a*, 45*b*, and 45*c*. A decoder network 70 similar to the previously described decoder network 63 receives the output signals of the flip-flops FF4–FF6 and has seven separate output lines designated 70*a*–70*g*, associated respectively with the data buses B1–B7. Again, if the state of the unload register 36 is 000, then none of the data buses are connected to the input terminals of the register 11; and the previously described encoding scheme for the flip-flops FF4–FF6 may be used to energize the output lines of the decoder 70. The unload gate means takes the form of a matrix of AND gates similar to the one previously described in connection with the load gate means 37, including an AND gate for each of the data bits of the resistor 11 (arranged in 24 columns) and a row of AND gates for each of the data buses (N−1). The 24 input terminal leads to the register 11 are designated respectively 38*a*′–38*x*′. The row of AND gates in the unload gate means 47 associated with data bus B2 are designated respectively 72*a*–72*x*; and each of these AND gates has: (1) an enabling input terminal connected to the output lead 70*b* of the decoder 70, (2) an input signal lead (designated respectively B2*a*–B2*x*) connected respectively to one of the leads of the data bus B2, (3) an output lead connected respectively to one of the input leads 38*a*′–38*x*′ to register 11, and a strobe input lead connected to receive a strobe pulse along a line 75.

The fifth row of AND gates, designated respectively 73*a*–73, each have: (1) an input enabling lead connected to the output line 70*f* of decoder 70, (2) an input signal lead connected respectively to one of the lines B6*a*–B6*x* of the data bus B6, (3) an output terminal connected respectively to one of the lines 38*a*′–38*x*′ of the register 11, and (4) a strobe input connected to the strobe line 75. Thus, for example, if the unload command is 010, the decoder 70 sends an enabling signal along line 70*b* to enable all of the AND-gates 82*a*–82*x* to couple the signal contents of bus B2 to the input of the register 11 when the strobe pulse occurs (i.e., after it is insured that the signals have reached a quiescent state).

It will thus be realized that the contents of any register or similar logic network may be loaded onto a selected data bus responsive to a command signal, and that more than one register may be selected and the signal contents thereof loaded onto predetermined and separate data buses. Further, the signal contents of the selected register appear on the predetermined data bus until the control register or flip-flops change their stage as determined by a new command signal. One of the command signals is reserved for defining a state in which an associated register is not in communication with any data bus. This signal may be used for terminating the communication with any data bus. This signal may be used for terminating the communication between a selected register and a data bus.

As an illustrative example of the utility of the inventive system, it will be assumed that the inputs to a parallel logic adder are defined by the contents of buses B1 and B2 and the sum of the contents of registers RI and RII is desired in register RI. The following steps or control sequence would accomplish the desired results:

1. Place the contents of register RI on bus B1 (that is, send a command signal 001 to the load control register 12). Place the contents of register RII on bus B2 (send a command signal 010 to load control register 35). Place the output of the adder on bus B3 (the adder may be the combinational logic net means of block 53 in which case the command 011 would be transmitted to the load control register 59).
2. Permit a sufficient time delay for the signal outputs of the adder to become stable (this could be accomplished by conventional strobe methods or by using a quarter-clock pulse to gate the output of the adder), and gate the contents of bus B3 to register RI (by sending a command 011 to the unload control register 13).

It will be recognized that in the above example, register RI serves as an accumulating register. If a whole column of numbers are desired to be added, it is necessary only to include the following steps:

3. Test for the end of the list; and if not exhausted proceed to step 4.
4. Load the next number in register RII (for example, via the unload gate means 47).
5. Go to step 2.

From this example it will be observed that the continuous and controlled presence of data signals on selected ones of the data buses permits such devices as adders, comparators, etc., to be connected to the data buses rather than to the registers. Thus, any register connected to the buses may serve as operand registers, or, alternatively, as receiving registers. Further, the data paths for repetitive operations may be established at the beginning of a sequence of operations (or loop) and remain unchanged for the duration of the operation.

Having thus described in detail a preferred embodiment of the inventive system, persons skilled in the art will appreciate that equivalent structure may be substituted for certain of the elements described and that other modifications may be made while continuing to practice the principle of the invention; and it is, therefore, intended that all such modifications and sub-stitutions be covered as they are embraced within the spirit and scope of the appended claims.

I claim:

1. In a data processing system the combination comprising a plurality of data buses, each including a plurality of separate digit lines, a plurality of storage register means each capable of storing multiple binary signals, control register means associated with each of said storage register means for storing a plurality of binary signals representative of a desired transmission between the data contents one of said registers and corresponding digit lines of one of said buses, each of said control register means independently operable of the others, and a plurality of gating means, one for each of said storage registers, each receiving the signal contents of one of said register means for transmitting said binary signals respectively to said digit lines of a selected bus responsive to said signals stored in the control means associated with that register means, whereby the signal contents of more than one storage register may be selectively transmitted to separate one of said data buses or to the same data bus and the transmission will be effective until the signal contents of the activating control register means is altered.

2. The system of claim 1 wherein said control means is responsive to command signals for communicating its associated register with a selected data bus whereby an established communication between an associated register means and said selected data bus is terminated only upon receipt of a different command signal by said control means.

3. The system of claim 1 further comprising unload control register means associated with at least one of said register means for storing signals representative of a desired communication between a selected data bus and said associated register means, and unload gate means having input buses for transmitting the data on a selected data bus to the input of said associated register means responsive to said signals stored in said unload control register means.

4. The system of claim 1 further comprising combinational logic net means including a plurality of binary signals on separate output digit lines, load control register means associated with said logic net means for storing signals representative of a desired transmission between the output digit lines of said logic net means and a predetermined data bus, and load gate means having input means connected to the digit lines of said logic net means and a plurality of output channel means each connected to the digit lines of different data buses for communicating said digit lines of said logic net means with the digit lines of a selected data bus responsive to said signals stored in said load register means associated with said logic net means.

5. In combination, a plurality of data buses, each having a number of separate lines each associated with a bit in a word, a plurality of storage register means for storing binary signals representative of a word, a control register means associated with each of said storage register means, and gating means for each of said storage register means for selectively gating the signal contents of an associated storage register to a selected one of said data buses responsive to the signal contents of the control register means associated with that storage register means from which the signal contents are being transmitted.

* * * * *